US011262985B2

(12) United States Patent
Luo et al.

(10) Patent No.: US 11,262,985 B2
(45) Date of Patent: Mar. 1, 2022

(54) PRETRAINING UTILIZING SOFTWARE DEPENDENCIES

(71) Applicant: International Business Machines Corporation, Armonk, NY (US)

(72) Inventors: Yan Luo, Concord (CA); Liujia Shao, Markham (CA); Yan Xu, Richmond Hill (CA); Sibin Fan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/813,778

(22) Filed: Mar. 10, 2020

(65) Prior Publication Data
US 2021/0286598 A1    Sep. 16, 2021

(51) Int. Cl.
| | | |
|---|---|---|
| *G06F 9/44* | (2018.01) |
| *G06F 8/33* | (2018.01) |
| *G06N 3/02* | (2006.01) |
| *G06N 20/00* | (2019.01) |
| *G06F 8/73* | (2018.01) |

(52) U.S. Cl.
CPC .................. *G06F 8/33* (2013.01); *G06F 8/73* (2013.01); *G06N 3/02* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,140,202 B1 | 11/2018 | Petracca | |
| 2019/0332666 A1* | 10/2019 | Dadachev | G06N 20/00 |
| 2021/0042391 A1* | 2/2021 | Gehrmann | G06N 3/08 |

(Continued)

FOREIGN PATENT DOCUMENTS

| | | |
|---|---|---|
| CN | 106021410 A | 10/2016 |
| CN | 104123273 B | 6/2017 |
| CN | 109213520 A | 1/2019 |

(Continued)

OTHER PUBLICATIONS

Wei, Retrieve and Refine: Exemplar-based Neural Comment Generation, arXiv, Oct. 2019 (Year: 2019).*

(Continued)

*Primary Examiner* — Insun Kang
(74) *Attorney, Agent, or Firm* — Randy E. Tejeda (57) ABSTRACT

In an approach to creating code snippet auto-commenting models utilizing a pre-training model leveraging dependency data, one or more computer processors create a generalized pre-training model trained with one or more dependencies and one or more associated dependency embeddings, wherein dependencies include frameworks, imported libraries, header files, and application programming interfaces associated with a software project. The one or more computer processors create a subsequent model with a model architecture identical to the created pre-training model. The one or more computer processors computationally reduce a training of the created subsequent model utilizing one or more trained parameters, activations, memory cells, and context vectors contained in the created pre-training model. The one or more computer processors create deploy the subsequent model to one to more production environments.

17 Claims, 3 Drawing Sheets

(56) References Cited

U.S. PATENT DOCUMENTS

2021/0240453 A1* 8/2021 Badlani ............... G06N 3/0454

FOREIGN PATENT DOCUMENTS

| CN | 109683946 A | 4/2019 | | |
|---|---|---|---|---|
| CN | 109783079 A | 5/2019 | | |
| CN | 109960506 A | 7/2019 | | |
| WO | WO-2019223804 A1 * | 11/2019 | ............... | G06F 8/30 |

OTHER PUBLICATIONS

Hu, et al., "Deep Code Comment Generation", ICPC'18, May 27-May 28, 2018, Gothenburg, Sweden, 2018, © 2018 Association for Computing Machinery, 11 pages, <https://xin-xia.github.io/publication/icpc182.pdf>.

Iyer, et al., "Summarizing Source Code using a Neural Attention Model", Proceedings of the 54th Annual Meeting of the Association for Computational Linguistics, pp. 2073-2083, Berlin, Germany, Aug. 7-12, 2016, © 2016 Association for Computational Linguistics, <https://www.aclweb.org/anthology/P16-1195>.

Liang, et al., "Automatic Generation of Text Descriptive Comments for Code Blocks", The Thirty-Second AAAI Conference on Artificial Intelligence (AAAI-18), 2018, pp. 5229-5236, <https://www.aaai.org/ocs/index.php/AAAI/AAAI18/paper/viewFile/16492/16072>.

* cited by examiner

PRETRAINING UTILIZING SOFTWARE DEPENDENCIES

BACKGROUND

The present invention relates generally to the field of machine learning, and more particularly to creating a code snippet auto-commenting model training pipeline.

Artificial neural networks (ANNs) are computing systems inspired by biological neural networks. The ANN itself is not an algorithm, but rather a framework for many different machine learning algorithms to work together and process complex data inputs. Such systems "learn" to perform tasks by considering examples, generally without being programmed with any task-specific rules. For example, in an illustrative image recognition task ANNs learn to identify images that contain cats by analyzing example images that are correctly labeled as "cat" or "not cat" and using the results to identify cats in other images. ANNs accomplish this without any prior knowledge about cats, for example, that cats have fur, tails, whiskers, and pointy ears. Instead, ANNs automatically generate identifying characteristics from learning data. ANNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times. A recurrent neural network (RNN) is a class of ANN where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition.

SUMMARY

Embodiments of the present invention disclose a computer-implemented method, a computer program product, and a system for creating code snippet auto-commenting models utilizing a pre-training model leveraging dependency data. The computer-implemented method includes one or more computer processers creating a generalized pre-training model trained with one or more dependencies and one or more associated dependency embeddings, wherein dependencies include frameworks, imported libraries, header files, and application programming interfaces associated with a software project. The one or more computer processors create a subsequent model with a model architecture identical to the created pre-training model. The one or more computer processors computationally reduce a training of the created subsequent model utilizing one or more trained parameters, activations, memory cells, and context vectors contained in the created pre-training model. The one or more computer processors create deploy the subsequent model to one to more production environments.

DETAILED DESCRIPTION

Traditionally, teams, developers, and engineers utilize code comments to explain one or more snippets of code in a natural language format, allowing future developers and individuals the ability to rapidly interpret and comprehend code without the direct involvement of the original developer. Furthermore, developmental organizations, teams, and engineers may have multiple coding standards, principles, and expectations that projects, specifically code snippets and comments, must adhere to. Frequently, developers and engineers may depart from projects during active development requiring others to interpret and modify unmaintained code. Code comments greatly assist with code interpretation due to code comments allowing developers to explain associated code (e.g., snippets) in a natural language fashion, although significant issues may arise when code comments are lacking, confusing, or not present. Said issue is particularly compounded with business rule discovery in legacy enterprise systems where comments and documentation are frequently lacking and access to the developers, originally coded and supported the system, is limited. Furthermore, this issue recently arises during rapid development sessions (e.g., agile, scrum, etc.) where a multitude of developers are concurrently working on several codependent submodules.

Many organizations deploy one or more models created, designed, and trained to generate natural language code comments automatically or when a developer completes a snippet, function, module, and/or program. Said models reduce the impact of missing or inadequate code comments by generating comments without developer involvement, although the creation of the models requires enormous amounts of tailored training statements. Generally, an efficient recurrent neural network auto-commenting model could include millions of parameters and hyperparameters. Moreover, the training sets are often directed to specific programming language, program, organization, team, or individual coding style, thus limiting the generalization potential of the model. Further, as the code evolves over time, a level of accuracy must be maintained, where comments must continue to be both accurate and complete. The amount of required training data prohibitively restricts training of said models to projects containing large annotated code bases. Small to medium projects and corresponding inadequate training sets may suffer from prediction errors, overfitting and underfitting if the utilized training data is insufficient.

Embodiments of the present invention recognize that the creation, training, and deployment of an auto-commenting code model is significantly improved by utilizing a highly generalizable pre-training model trained with static analyzed dependency embeddings. Embodiments of the present invention recognize that model performance is improved by leveraging dependency data in a pre-training layer (e.g., model). Embodiments of the present invention recognize that embedded common dependences provide highly generalizable training sets and trained models. Embodiments of the present invention recognize that utilizing one or more pre-training models to train a subsequent auto-commenting model improves an accuracy of the subsequent auto-commenting model. Embodiments of the present invention recognize that training a pre-training model utilizing generalized and processed dependency data significantly reduces an amount of training sets required to train an accurate model. A further embodiment of the present invention recognizes that reducing an amount of training sets required to train an accurate model reduces required system capabilities (e.g., reduction in storage requirements, computational resources, etc.). Embodiments of the present invention generate natural language rules, on the fly, as a user develops (i.e., writes code) in an integrated development environment (IDE) or text editor. Implementation of embodiments of the invention may take a variety of forms, and exemplary implementation details are discussed subsequently with reference to the Figures.

The present invention will now be described in detail with reference to the Figures.

Figure 1:
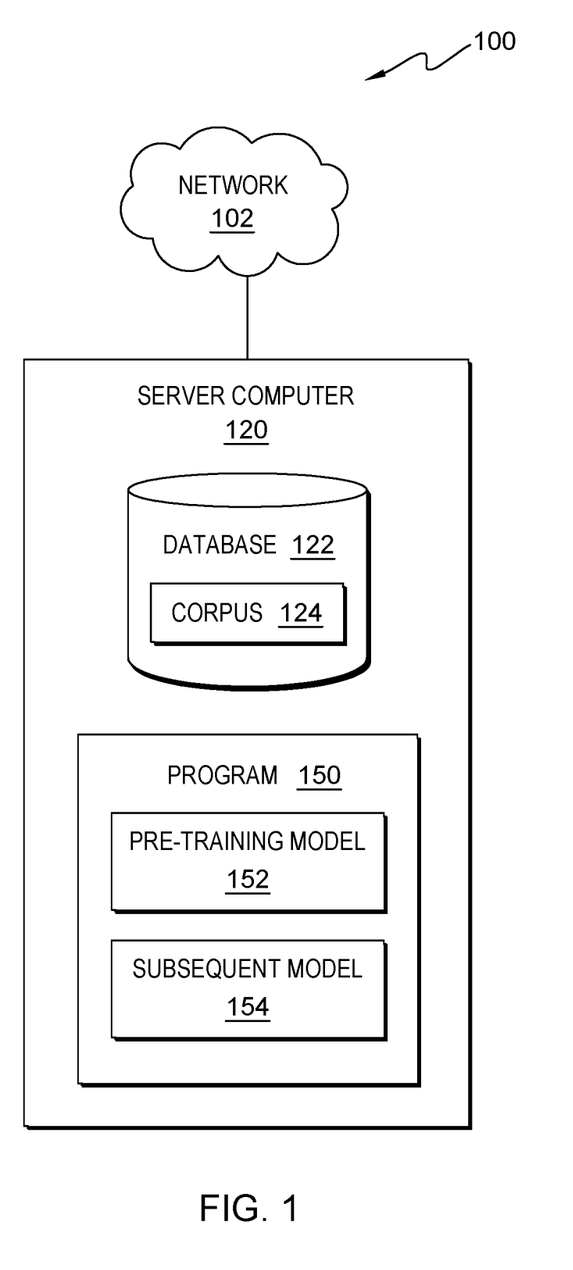
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted, and described in further detail with respect to FIG. 3.

Database 122 is a repository for data used by program 150. In the depicted embodiment, database 122 resides on server computer 120. In another embodiment, database 122 may reside on computing device 110 or elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as a plurality of training, testing, and validation sets. In an embodiment, database 122 contains corpus 124.

Corpus 124 may contain one or more instances of code documents (e.g., training data and/or sets). In an embodiment, code documents include a plurality of code snippets (e.g., single line and multi-line code segments, functions, modules, structures, objects, etc.) and associated code comments (i.e., natural language explanation of a section of code). In this embodiment, each code snippet is paired with one or more code comments. In various embodiments, corpus 124 is limited to a programming language such as C++, etc. In another embodiment, corpus 124 coding documents from programming languages within a programming language family (syntactically and procedurally similar programming languages). In an embodiment, corpus 124 contains unprocessed code documents. In another embodiment, corpus 124 contains natural language processed (e.g., section filtered, sentence split, sentence tokenized, part of speech (POS) tagged, etc.) code documents. In a further embodiment, corpus 124 contains vectorized (i.e., one-hot encoding, word embedded, dimension reduced, etc.) code documents as discussed in step 204. In an embodiment, code documents (e.g., processed, or unprocessed) contained within corpus 124 are structured into a plurality of training, testing, and validation sets. In this embodiment, each set contains code and code comment pairs (e.g., code snippet and associated natural language comments).

In various embodiments, code comments include required parameters, return value, return type, and snippet purpose (i.e., intention of the programmer). In another embodiment, code corpus 124 may include a series (e.g., one or more sets) of vectors containing code information corresponding to a plurality of determined features including, but not limited to, comment complexity, code complexity, code length, comment length, intermediate representation objects (e.g., bytecode, heterogeneous system architecture (HSA) layer, etc.), abstract syntax tree, etc. In yet another embodiment, information contained in corpus 124 include preprocessed vectors that contain a single word per dimension as illustrated in one hot encoding as described in FIG. 2. In various embodiments, information contained in corpus 124 include word embedded vectors that contain contextual and relational data (e.g., relating to words that precede and follow a target word).

Pre-training model 152 (PTM 152) and subsequent model 154 (SM 154) utilizes deep learning to identify and learn associations between code snippets and code comments (e.g., auto-commenting model (e.g., a model that dynamically creates natural language representations of code)), representing the associations in one or more transferrable neural networks (e.g., recurrent neural network (RNN), long short-term memory (LSTM), deep stacking network (DSN), deep belief network (DBN), convolutional neural networks (CNN), compound hierarchical deep models, etc.) trained with unsupervised or supervised methods. In the depicted embodiment, PTM 152 and SM 154 utilize an RNN trained utilizing supervised training methods. In an embodiment, SM 154 has the same structure and architecture as PTM 152. In an embodiment, program 150 utilizes PTM 152 to generate generic (e.g., based on dependency information, etc.) code comments when fed with code snippets based on associated dependencies. PTM 152 is trained and tuned to generalize on unseen data points from similar domains (e.g., similar programming languages, common dependencies, etc.). In various embodiments, SM 154 utilizes transferrable neural network algorithms and models trained with supervised and/or unsupervised methods. In another embodiment, program 150 utilizes transfer learning principles (e.g., inductive, unsupervised, and transductive transfer learning) to create and train SM 154. In a further embodiment, program 150 transfers instances (e.g., knowledge from a source domain), feature-representations (e.g., feature representations that minimize domain divergence and reduce error rates), parameters (e.g., hyperparameters), and relational knowledge (e.g., data points that have relationships with other data points). Once trained, SM 154 assesses a code snippet by considering different features, available as structured or unstructured data, and applying relative numerical weights. The training of PTM 152 and SM 154 is depicted and described in further detail with respect to FIG. 2.

Program 150 is a program for creating code snippet auto-commenting models utilizing a pre-training model leveraging dependency data. In various embodiments, program 150 may implement the following steps: creating, by one or more computer processors, a generalized pre-training model trained with one or more dependencies and one or more associated dependency embeddings, wherein dependencies include frameworks, imported libraries, header files, and application programming interfaces associated with a software project; creating a subsequent model with a model architecture identical to the created pre-training model; computationally reducing a training of the created subsequent model utilizing one or more trained parameters, activations, memory cells, and context vectors contained in the created pre-training model; deploying the subsequent model to one or more production environments. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
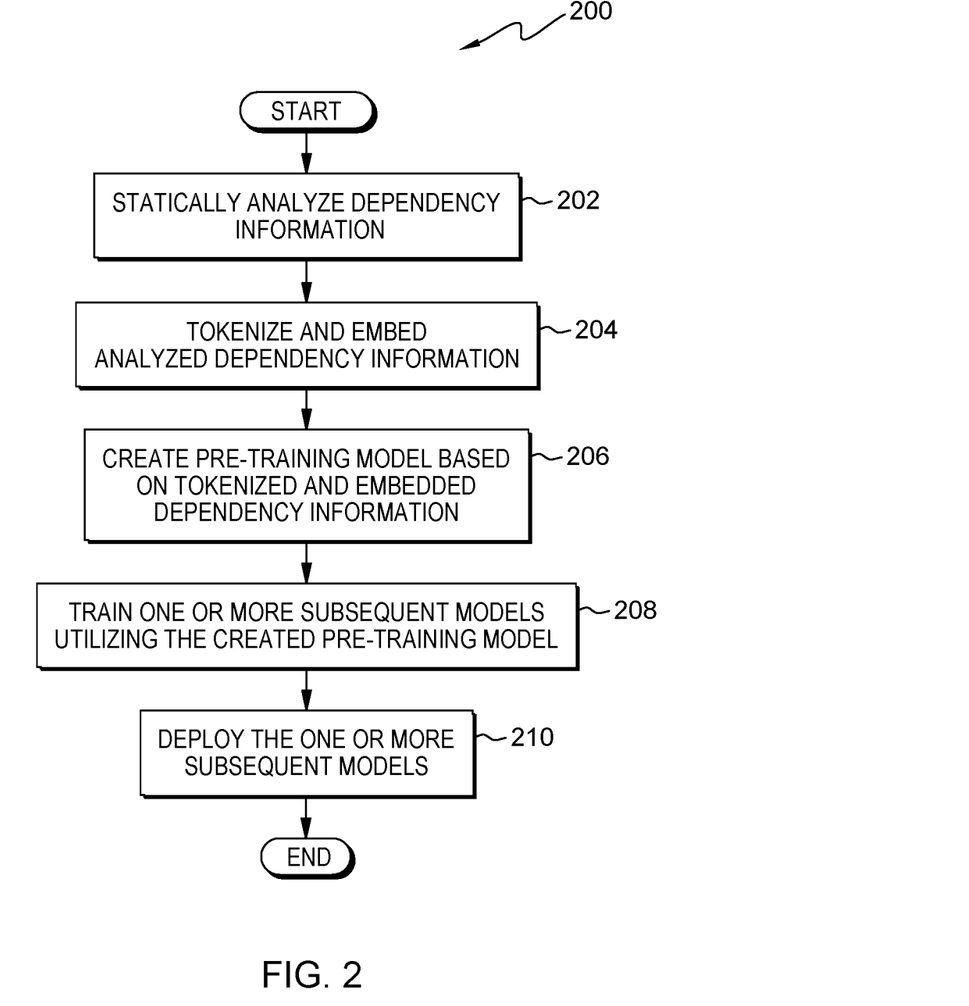
FIG. 2 is a flowchart depicting operational steps of a program, on a server computer within the computational environment of FIG. 1, for creating code snippet auto-commenting models utilizing a pre-training model leveraging dependency data, in accordance with an embodiment of the present invention.

FIG. 2 is a flowchart depicting operational steps of program 150, for creating code snippet auto-commenting models utilizing a pre-training model leveraging dependency data, in accordance with an embodiment of the present invention.

Program 150 statically analyzes dependency information (step 202). In an embodiment, program 150 automatically initiates when presented, inputted, or fed with one or more code snippets, dependency information, or training sets. In another embodiment, program 150 initiates when provided access to and/or receives one or more corpuses (e.g., corpus 124). In an embodiment, program 150 performs a plurality of static analyses (e.g., abstract interpretation, data-flow analysis, symbolic execution, model checking, etc.) on an input (e.g., one or more program files, software projects, modules, etc.). In an embodiment, program 150 utilizes static analysis to determine an effect that a code snippet has on a system state. In this embodiment, program 150 creates a mapping between statement and system effects. In another embodiment, program 150 (e.g., dependency extractor) extracts program dependencies (e.g., interdependence between software modules), deconstructs naming conventions (e.g., tokens), and extracts a plurality of contexts.

In various embodiments, dependencies include common frameworks, imported libraries, imported packages, header files, and application programming interfaces (APIs) associated with software. In an embodiment, program 150 retrieves code snippets, code comments, and documentation associated with one or more dependencies. For example, modern applications depend on system C libraries, providing common facilities required by the applications. In a further example, network applications typically share common low-level networking libraries. In a further embodiment, program 150 retrieves one or more related or associated programmatic conventions such as function names, variable names, available data structures, system functions, etc. For example, program 150 analyzes a common C header file, for example stdio.h, and extracts common functions, variables, structures, and associated code comments, establishing a highly generalizable base for subsequent models. In another embodiment, program 150 retrieves a plurality of computer-readable rules and guidelines dictating naming conventions, indentations, functions, commenting, line breaks, data structures, memory allocation, typedefs, etc. In various embodiments, program 150 identifies one or more program artifacts associated with an input program file or associated dependencies. In a further embodiment, program 150 identifies program artifacts associated with downstream software such as source code, copybooks, and header files. In a further embodiment, program 150 extracts code information from program files within corpus 124 including programmatic conventions, similar programming languages and families, and associations to relevant portions of other similar program files and applications.

Program 150 creates a plurality of code and comment pairs (e.g., a dependency-based training set). In an embodiment, program 150 partitions the plurality of dependency code and associated comments into multiple training, testing, and validation sets. In this embodiment, program 150 processes a plurality of code snippets and associated code comments utilizing one or more natural language processing (NLP) techniques. For example, program 150 utilizes NLP to parse sentences or terms in a code document (e.g., plurality of snippet and comment pairs). In various embodiments, program 150, non-deterministically, divides the processed sets into training sets and test sets. In the depicted embodiment, program 150 creates a training set including code and comment pairs associated with the input program file and a training set includes code and comment pairs associated with dependencies. In another embodiment, program 150 identifies, determines, and constructs (e.g., generalizes) a vocabulary specific to corpus 124, the input program file, or one or more downstream programs and projects.

Program 150 tokenizes and embeds analyzed dependency information (step 204). In various embodiments, program 150 performs preprocessing techniques (e.g., removing reserved words (public, return, void, etc.), extracting contextual words, tokenizing data structures, retrieving and applying programmatic conventions, applying weights, etc.) on entire programs or smaller code snippets. In another embodiment, program 150 tokenizes and aggregates associated code snippets with applicable data stored in database 122 and corpus 124. Applicable data may be any information or metadata that is associated with a code snippet, such as historical rules, associated feature vectors, similar code snippets based in other programming languages, associated supporting files, and code complexity.

In an embodiment, program 150 utilizes one-hot encoding techniques to vectorize categorical or string-based (word/term based) feature sets. For example, when vectorizing feature sets of individual words, program 150 creates a one-hot encoded vector comprising a 1×N matrix, where N symbolizes the number of distinguishable terms. In this embodiment, program 150 utilizes one-hot encoding to recode categorical data into a vectorized form. For example, when vectorizing an example term feature set consisting of [positive, numerical, string], program 150 encodes said corresponding feature set into the array containing [[1,0,0], [0,1,0], [0,0,1]. In various embodiments, program 150 utilizes word embedding techniques such as doc2vec to produce vectors which denote similarities between words that share common contexts. Word embedding techniques create word-based vectors, similar to one-hot encoding, although word embedding creates vectors that are structured so that similar words are positioned in close proximity to each other in the vector space. Another distinction between one-hot encoding and word embedding is that word embedding allows for a vector space dimension to include multiple words while one-hot encoding creates vector spaces with one dimension per word. In an embodiment, program 150 utilizes embedding to reduce the number of dimensions thus increasing the training speed of the model and reducing system memory requirements. In an embodiment, program 150 creates one or more embeddings (e.g., mapping of a discrete variable to a vector of continuous numbers) specific to corpus 124, the input program file, and associated dependencies. In an embodiment, program 150 utilizes a deep learning model to, exclusively, learn and output dependency embeddings associated with an input software project or commonly imported dependencies. In this embodiment, program 150 utilizes the created embeddings to map and group related dependency information and comments. In another embodiment, program 150 utilizes the created embeddings as an embedding layer (e.g., hidden layer) in a pre-training model and/or subsequent model.

Program 150 creates a pre-training model based on tokenized and embedded dependency information (step 206). In an embodiment, program 150 initializes the pre-training model (i.e., PTM 152) with randomly generated weights. In an alternative embodiment, program 150 initializes the pre-training model with weights calculated from the analysis described above in steps 202 and 204. In alternative embodiments, the pre-training model may be represented as a simple neural network or a specialized neural network such as Markov chains, perceptron, deep feed forward (DFF)), etc. In the depicted embodiment, the pre-training model is represented as a recurrent neural network. In an embodiment, program 150 trains the pre-training model by inputting a plurality of encoded, vectorized, and embedded training sets (e.g., code snippet and comment pairs), as described above. In various embodiments, the data (e.g., code snippets) contained with said training sets are labeled with associated comments enabling the pre-training model to learn what features (e.g., code elements) are correlated to a specific comment, prior to use. In various embodiments, the labelled data includes the programming language of the code in addition to the snippet and an associated comment. The training set includes examples of a plurality of features such as tokenized code segments, functions, variables, objects, data structures, etc. In an embodiment, a pre-training model contains a hidden layer containing the embeddings created in step 204.

Responsive to the program 150 initializing a pre-training model, program 150 utilizes the processed training sets, as described above, to perform supervised training of the pre-training model. As would be recognized by one skilled in the art, supervised training determines the difference between a prediction and a target (i.e., the error), and back-propagates the difference through the layers such that the pre-training model "learns". In an embodiment, program 150 determines whether a sufficient accuracy is obtained by utilizing test sets. In another embodiment, program 150 utilizes a cross-entropy loss (i.e., a loss function) to determine a level of accuracy of a model. In this embodiment, program 150 compares the predicted sequence (e.g., the generated comment) with an expected sequence (e.g. correct comment). In this embodiment, program 150 determines sufficient accuracy based on an error rate generated by a pre-training model. If the calculated accuracy is insufficient (e.g., does not exceed an accuracy threshold or exceeds an error rate threshold), then program 150 continues with supervised training of the pre-training model. If the calculated accuracy is sufficient, then program 150 ends the training process.

Program 150 trains one or more subsequent models utilizing the created pre-training model (step 208). Program 150 utilizes the pre-training model, created in step 206, to create, initialize, train, and/or fine tune one or more models (e.g., subsequent models). In an embodiment, program 150 creates one or more subsequent models utilizing identical model architecture as the pre-training model. In this embodiment, model architecture includes, but is not limited to, training method (e.g., supervised, unsupervised, semi-supervised, and reinforcement learning), model representation (e.g., neural network, decision trees, model ensembles, etc.), and evaluation methods (e.g., accuracy, prediction, recall, error likelihood methods and functions), optimization. In an embodiment, program 150 transfers (e.g., domain adaption, domain confusion, multitask learning, one-shot learning, zero-shot learning, etc.) the knowledge retained in the pre-training model (e.g., trained with dependency data) to one or more subsequent models. In another embodiment, program 150 initializes one or more subsequent models utilizing the knowledge sets retained in the pre-training model. In various embodiments, program 150 utilizes the pre-training model to transfer one or more knowledge sets (e.g., learned information), such as associated weights, biases, trained parameters, activations (i.e., output of a node given an input or set of inputs), memory cells (i.e., long short-term memory units), and context vectors (i.e., contextual embeddings), to one or more subsequent models. In another embodiment, program 150 duplicates the pre-training model and further trains said model to create one or more subsequent models, each with a distinct or specific domain. For example, PTM 152 is trained with typical dependency data associated with a family of procedural programming languages. In this example, program 150 utilizes PTM 152 and a plurality of retained knowledge sets to initialize and train one or more subsequent models. In an embodiment, if program 150 detects one or more subsequent models utilizing one or dependencies contained within PTM 152, then program 150 determines whether to fine tune the one or more subsequent models or to delete said models and recreate the models based on PTM 152. For example, program 150 utilizes the architecture and parameters of PTM 152 to initialize the training for SM 154 (e.g., software project).

Accordingly, program 150 utilizes the architecture and parameters of the pre-training model to initialize a training of subsequent models. Program 150 leverages the knowledge (features, weights, etc.) from the pre-training model for training of new (i.e., subsequent) models, thus reducing the required amount of training data and reducing computational requirements (e.g., memory, etc.). Program 150 utilizes the training for the input software project as a "warm start" instead of training the model from an empty state, thus increasing the effectiveness of the training while reducing the required number of training set and data. Program 150 utilizes the information "learned" in the pre-training model to computationally reduce the requirements (e.g., training time, required training sets, storage infrastructure to support said training sets, etc.) of a training and deploying one or more subsequent models, while maintaining high levels of accuracy (e.g., at least when compared to a model crated and trained without a pre-training model).

Program 150 deploys the one or more subsequent models (step 210). In an embodiment, program 150 logs code snippets, associated code comments, and associated dependency data into corpus 124 and retrains the pretraining model with the adjusted corpus and associated training sets. In another embodiment, program 150 may receive user feedback through a graphical user interface (not depicted). For example, after program 150 utilizes SM 154 to generate a code comment based on a code snippet, a user provides feedback for the generated comment on the graphical user interface. In an embodiment, feedback includes a simple positive or negative response. In another embodiment, feedback includes a user confirmation of a subsequently trained model and generated code comment. For example, if program 150 incorrectly generates an insufficient (e.g., confusing, lacking details, undescriptive, objectively incorrect, etc.) comment, the user provides negative feedback and correct the model. In another embodiment, program 150 utilizes one or more NLP techniques to determine and log whether the response of the user is positive or negative. In an embodiment, program 150 feeds the user feedback and the corrected comment into SM 154, allowing program 150 to adjust the model accordingly. In an embodiment, program 150 tunes (e.g., remodel, fine-tunes) the pre-training model utilizing adjusted corpus 124. In another embodiment, program 150 tunes one or more similar downstream software projects utilizing corpus 124, retrained PTM 152, and trained SM 154. For example, program 150 utilizes a pre-training model and a subsequently created auto-commenting model to retrain and tune other models.

In an embodiment, program 150 deploys created and trained subsequent auto-commenting model to a production environment or server. In various embodiments, program 150 deploys a plurality of subsequently tuned models to a production environment or to a plurality of respective production, test, or auxiliary environments. In another embodiment, program 150 determines which environment to deploy a model from a plurality of environments (e.g., test, production, backup server, containers, or virtual machines). For example, if an auto-commenting model requires 2 gigabytes of storage space to operate and a specified production environment only has 1 gigabyte available, then program 150 eliminates said production environment and selects a suitable environment. In an embodiment, the user instructs program 150 to deploy to a provided environment. In various embodiments, program 150 integrates (e.g., deploys, installs, adds, etc.) a subsequent model to one or more integrated development environments (IDE(s)), automatically parsing and feeding one or more code snippets, and, concurrently (e.g., in real time) outputting (e.g., creating, generating, etc.) one or more code comments as one or more users develop in the IDE. In this embodiment, program 150 displays the one or more created code comments within the IDE. In various embodiments, program 150 creates a document with each generated code comment in association with a code snippet.

Figure 3:
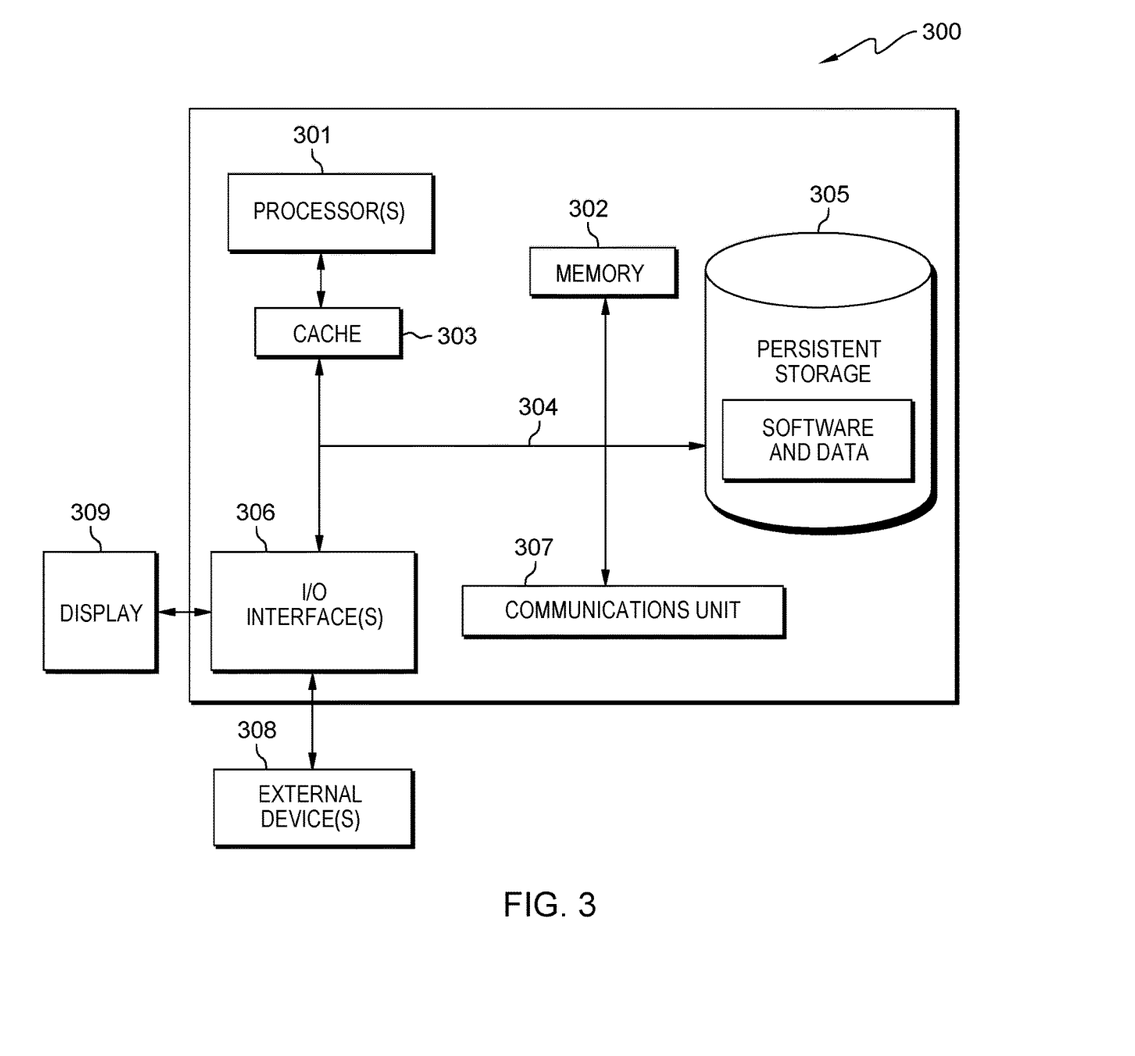
FIG. 3 is a block diagram of components of the server computer, in accordance with an embodiment of the present invention.

FIG. 3 depicts a block diagram of components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 each include communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected to server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
statically analyzing, by one or more computer processors, one or more dependencies associated with software project, wherein the dependencies include frameworks, imported libraries, header files, and application programming interfaces associated with the software project;
creating, by one or more computer processors, one or more dependency embeddings mapping the one or more statically analyzed dependencies;
creating, by one or more computer processors, one or more training sets utilizing the one or more created dependency embeddings;
creating, by one or more computer processors, a generalized pre-training model trained with the one or more training sets, the one or more statically analyzed dependencies and the one or more created dependency embeddings;
creating, by one or more computer processors, a subsequent model with a model architecture identical to the created pre-training model;
training the created subsequent model utilizing the created pre-training model and computationally reducing, by one or more computer processors, the training of the created subsequent model utilizing one or more trained parameters, activations, memory cells, and context vectors associated with the software project contained in the created pre-training model; and
deploying, by one or more computer processors, the subsequent model to one or more production environments.

2. The method of claim 1, comprising: extracting, by one or more computer processors, one or more imported dependencies associated with the software project; constructing, by one or more computer processors, one or more naming convention dependent tokens; extracting, by one or more computer processors, one or more contexts associated with the software project; and creating, by one or more computer processors, one or more code and comment pairs utilizing the one or more extracted imported dependencies, the one or more constructed naming convention dependent tokens, and the extracted one or more contexts.

3. The method of claim 1, further comprising:
retraining, by one or more computer processors, one or more downstream software projects utilizing the created pre-training model.

4. The method of claim 1, wherein the created pre-training model is a recurrent neural network.

5. The method of claim 1, wherein the subsequent model is an auto-commenting model.

6. The method of claim 5, wherein the auto-commenting model is a recurrent neural network.

7. The method of claim 6, further comprises:
integrating, by one or more computer processors, the auto-commenting model into one or more integrated development environments.

8. The method of claim 7, further comprising:
concurrently creating, by one or more computer processors, one or more code comments utilizing the integrated auto-commenting model; and
displaying, by one or more computer processors, the one or more created code comments.

9. A computer program product comprising: one or more computer readable storage media and program instructions stored on the one or more computer readable storage media, the stored program instructions comprising:
program instructions to statically analyze one or more dependencies associated with a software project, wherein the dependencies include frameworks, imported libraries, header files, and application programming interfaces associated with the software project;
program instructions to create one or more dependency embeddings mapping the one or more statically analyzed dependencies;
program instructions to create one or more training sets utilizing the one or more created dependency embeddings;
program instructions to create a generalized pre-training model trained with the one or more training sets, the one or more statically analyzed dependencies and the one or more created dependency embeddings;
program instructions to create a subsequent model with a model architecture identical to the created pre-training model;
program instructions to train the created subsequent model utilizing the created pre-training model and computationally reduce the training of the created subsequent model utilizing one or more trained parameters, activations, memory cells, and context vectors associated with the software projects contained in the created pre-training model; and
program instructions to create deploy the subsequent model to one or more production environments.

10. The computer program product of claim 9, wherein the subsequent model is an auto-commenting model.

11. The computer program product of claim 10, wherein the auto-commenting model is a recurrent neural network.

12. The computer program product of claim 10, wherein the program instructions, stored on the one or more computer readable storage media, comprise:
program instructions to integrate the auto-commenting model into one or more integrated development environments.

13. The computer program product of claim 12, wherein the program instructions, stored on the one or more computer readable storage media, comprise:
program instructions to concurrently create one or more code comments utilizing the integrated auto-commenting model; and
program instructions to display the one or more created code comments.

14. A computer system comprising: one or more computer processors; one or more computer readable storage media; and program instructions stored on the computer readable storage media for execution by at least one of the one or more processors, the stored program instructions comprising:
program instructions to statically analyze one or more dependencies associated with a software project, wherein the dependencies include frameworks, imported libraries, header files, and application programming interfaces associated with the software project;
program instructions to create one or more dependency embeddings mapping the one or more statically analyzed dependencies;
program instructions to create one or more training sets utilizing the one or more created dependency embeddings;
program instructions to create a generalized pre-training model trained with the one or more training sets, the one or more statically analyzed dependencies and the one or more created dependency embeddings;
program instructions to create a subsequent model with a model architecture identical to the created pre-training model;
program instructions to train the created subsequent model utilizing the created pre-training model and computationally reduce the training of the created subsequent model utilizing one or more trained parameters, activations, memory cells, and context vectors associated with the software projects contained in the created pre-training model; and
program instructions to create deploy the subsequent model to one or more production environments.

15. The computer system of claim 14, wherein the subsequent model is an auto-commenting model.

16. The computer system of claim 15, wherein the auto-commenting model is a recurrent neural network.

17. The computer system of claim 15, wherein the program instructions, stored on the one or more computer readable storage media, comprise:
program instructions to integrate the auto-commenting model into one or more integrated development environments.

* * * * *